United States Patent
Margairaz et al.

(10) Patent No.: US 7,369,835 B2
(45) Date of Patent: May 6, 2008

(54) IMAGE REJECTION MIXER PROVIDING PRECISION IMAGE REJECTION

(75) Inventors: Didier Margairaz, San Jose, CA (US); Pierre Favrat, Milpitas, CA (US); Alain-Serge Porret, Sunnyvale, CA (US); Dominique Python, Sunnyvale, CA (US)

(73) Assignee: Xceive Corporation, Santa Clara, CA (US)

( * ) Notice: Subject to any disclaimer, the term of this patent is extended or adjusted under 35 U.S.C. 154(b) by 469 days.

(21) Appl. No.: 11/077,629

(22) Filed: Mar. 10, 2005

(65) Prior Publication Data

US 2006/0205377 A1 Sep. 14, 2006

(51) Int. Cl.
*H04B 1/10* (2006.01)

(52) U.S. Cl. .................. 455/302; 455/285; 455/326; 455/318

(58) Field of Classification Search ............ 455/285, 455/326, 307, 258, 302, 266, 306, 323, 295, 455/296, 303, 304, 314, 318, 324, 340; 375/350; 342/20, 159
See application file for complete search history.

(56) References Cited

U.S. PATENT DOCUMENTS

| | | | |
|---|---|---|---|
| 4,584,715 A | 4/1986 | Baars et al. | |
| 5,060,297 A * | 10/1991 | Ma et al. | 455/302 |
| 5,870,670 A | 2/1999 | Ripley et al. | |
| 5,901,349 A * | 5/1999 | Guegnaud et al. | 455/302 |
| 6,127,962 A * | 10/2000 | Martinson | 455/313 |
| 6,226,509 B1 * | 5/2001 | Mole et al. | 455/302 |
| 2004/0004674 A1* | 1/2004 | Birleson | 348/731 |

OTHER PUBLICATIONS

International Search Report, 9 pages.

* cited by examiner

*Primary Examiner*—Nay Maung
*Assistant Examiner*—John J. Lee
(74) *Attorney, Agent, or Firm*—Patent Law Group LLP; Carmen C. Cook

(57) ABSTRACT

An image rejection mixer includes a first mixer, a second mixer, a first output adjust circuit, and a second output adjust circuit. The first mixer is coupled to receive an input RF signal and a local oscillator signal and includes a first mixer stage and a first output load stage. The second mixer is coupled to receive the input RF signal and a phase-converted local oscillator signal and includes a second mixer stage and a second output load stage. The first output adjust circuit is coupled to the first output load stage for modifying the signal waveform of a first output signal of the first mixer. The second output adjust circuit is coupled to the second output load stage for modifying the signal waveform of a second output signal of the second mixer. In this manner, the near-perfect image rejection result in the final IF signal can be obtained.

14 Claims, 7 Drawing Sheets

IMAGE REJECTION MIXER PROVIDING PRECISION IMAGE REJECTION

FIELD OF THE INVENTION

The present invention relates to image rejection mixers, and more particularly to an image rejection mixer for use in a television tuner for precisely rejecting unwanted image frequencies.

DESCRIPTION OF THE RELATED ART

Conventional television receivers employ a tuner to tune or select the desired radio frequency (RF) signals in a given frequency range (6 MHz, 7 MHz or 8 MHz) to the exclusion of all other signals in order to receive the desired channel. FIG. 1 is a conventional tuning system which can be used for the reception of low VHF, VHF and UHF broadcast channels. Referring to FIG. 1, tuning system 10 receives RF input signals on an input terminal 1. The input RF signal can be received from terrestrial broadcast or cable transmissions. The input RF signal is coupled to an RF input circuit including a bandpass filter 2, a bandstop filter 3 (also known as a "trap or notch filter"), and an RF amplifier 4 whose gain could be externally controlled. The output signal of the RF input circuit is coupled to a tuner circuit 8, typically an integrated circuit, for tuning the filtered input RF signal to the desired frequency range and generating an intermediate frequency (IF) signal having an intermediate frequency. Tuner 8 may include one or more mixers, denoted by a mixer 5, and one or more variable local oscillators, denoted by variable local oscillator 6. A tuning voltage generator 7 in tuner circuit 8 generates a control signal for controlling bandpass filter 2, bandstop filter 3 and variable local oscillator 6 for tuning to the desired channel.

In tuner system 10, the input RF signal for a selected channel is converted to an intermediate frequency by one or more frequency conversions using one or more mixers 5. The frequency of the one or more local oscillators 6 is selected based on the intermediate frequency assigned to the receiver and the desired channel. The frequency conversion is called a "down conversion" if the intermediate frequency is lower than the frequency of the signal at the input of the mixer. Furthermore, the frequency conversion is called "low-side mixing" if the frequency of the local oscillator is lower than the frequency of the input RF signal. On the other hand, the frequency conversion is called "high-side mixing" if the frequency of the local oscillator is higher than the frequency of the input RF signal.

The mathematical relations between the input RF frequency ($f_{RF}$), the local oscillator frequency ($f_{LO}$) and the intermediate frequency ($f_{IF}$) can be described as follows:

$$f_{IF}=f_{RF}-f_{LO} \text{ (down-conversion, low-side mixing);} \quad \text{Eq. Ia.}$$

and $$f_{IF}=f_{LO}-f_{RF} \text{ (down-conversion, high-side mixing).} \quad \text{Eq. IIa.}$$

One common problem encountered by conventional tuner systems is the presence of unwanted signals at an image frequency ($f_{image}$) with the wanted signal at the input RF frequency ($f_{RF}$). The operation of the mixers in the tuner circuit will actually convert the unwanted signals together with the wanted signals. The unwanted signals become superimposed on the wanted signal at the intermediate frequency, resulting in interferences. The relationship of the image frequency ($f_{image}$) to the local oscillator frequency ($f_{LO}$) and the intermediate frequency ($f_{IF}$) for down conversion and low-side mixing is given as follows:

$$f_{image}=f_{LO}-f_{IF} \quad \text{Eq. Ib.}$$

The relationship of the image frequency ($f_{image}$) to the local oscillator frequency ($f_{LO}$) and the intermediate frequency ($f_{IF}$) for down conversion and high-side mixing is given as follows:

$$f_{image}=f_{LO}+f_{IF} \quad \text{Eq. IIb.}$$

FIG. 2 is a frequency domain representation illustrating the interference problem introduced by an image frequency in a down-conversion, low-side mixing scheme. Referring to FIG. 2, the $f_{RF}$ frequency of the input signal is down-converted to an intermediate frequency $f_{IF}$, as given by Equation Ia above. However, the unwanted frequency $f_{image}$ is also down-converted to the same $f_{IF}$ intermediate frequency, as given by Equation Ib above. In the example shown in FIG. 2, the amplitude level of the unwanted signal is even higher than the amplitude of the wanted signal, resulting in a strong interference and corruption of information encoded in the input RF signal.

Methods for eliminating the unwanted image frequency during the conversion of an RF signal to an intermediate frequency are known. The conventional methods include filtering out the image frequency prior to frequency conversion or applying an image rejection mixer. An image rejection mixer operates to discriminate and filter the unwanted image frequency so that only the wanted signal at the input RF frequency ($f_{RF}$) remains after the frequency conversions.

FIG. 3 is a circuit diagram of a prior art image rejection mixer. Image rejection mixer 30 receives input RF signals on an input terminal 31. The input RF signals having a frequency $f_{RF}$ are coupled to two mixers 32a and 32b to be converted to an intermediate frequency at frequency $f_{IF}$. A tunable voltage-controlled oscillator (VCO) 34 provides the local frequency for tuning to the desired broadcast channel. A phase converter 33 is coupled between VCO 34 and mixer 32b. Another phase converter 35 is coupled between mixer 32b and a summer (or subtractor) 36. Summer 36 sums the mixed signals from mixer 32a and mixer 32b to generate the IF signal at frequency $f_{IF}$.

The mathematical equations describing the operation of image rejection mixer 30 of FIG. 3 are given below. In the present description, image rejection mixer 30 is operating in a down-conversion, low-side mixing scheme. However, the equations are also applicable for a high-side mixing scheme.

At point A, the input RF signals are given as:

$$A=V_{rf} \cdot \sin(2 \cdot \pi \cdot f_{RF} \cdot t)+V_{image} \cdot \sin(2 \cdot \pi \cdot f_{image} \cdot t),$$

At point B, the signal of VCO 34 is given as:

$$B=V_{lo} \cdot \sin[2 \cdot \pi \cdot (f_{RF}-f_{IF}) \cdot t]$$

At point B', the signal of VCO 34 after phase converter 33 is given as:

$$B'=V_{lo} \cdot \sin[2 \cdot \pi \cdot (f_{RF}-f_{IF}) \cdot t+90°]= \ldots = \ldots = V_{lo} \cdot \cos[2 \cdot \pi \cdot (f_{RF}-f_{IF}) \cdot t]$$

Assuming g is the conversion gain of mixer 32a, the signal at the output of mixer 32a, i.e. at point C, is given as:

$$C = g \cdot A \cdot B =$$
$$\ldots = g \cdot V_{rf} \cdot \sin[2 \cdot \pi \cdot f_{RF} \cdot t] \cdot V_{lo} \cdot \sin[2 \cdot \pi \cdot (f_{RF} - f_{IF}) \cdot t] + \ldots +$$

-continued $$g \cdot V_{image} \cdot \sin[2 \cdot \pi \cdot f_{image} \cdot t] \cdot V_{lo} \cdot \sin[2 \cdot \pi \cdot (f_{RF} - f_{IF}) \cdot t] =$$

$$g \cdot V_{rf} \cdot \sin[2 \cdot \pi \cdot f_{RF} \cdot t] \cdot V_{lo} \cdot \sin[2 \cdot \pi \cdot (f_{RF} - f_{IF}) \cdot t] +$$

$$\ldots + g \cdot V_{image} \cdot \sin[2 \cdot \pi \cdot (f_{RF} - 2 \cdot f_{IF}) \cdot t] \cdot$$

$$V_{lo} \cdot \sin[2 \cdot \pi \cdot (f_{RF} - f_{IF}) \cdot t] =$$

$$g \cdot V_{lo} \cdot V_{rf} \cdot \frac{1}{2} \cdot \{\cos[2 \cdot \pi \cdot f_{IF} \cdot t] - \cos[2 \cdot \pi \cdot (f_{RF} - f_{IF}) \cdot t]\} +$$

$$\ldots + \ldots + g \cdot V_{lo} \cdot V_{image} \cdot \frac{1}{2} \cdot$$

$$\{\cos[2 \cdot \pi \cdot (-f_{IF}) \cdot t] - \cos[(2 \cdot f_{RF} - 3 \cdot f_{IF}) \cdot t]\}$$

At that point, the undesirable frequencies are removed. So, at point C, the signal is given as:

$$C = g \cdot V_{lo} \cdot V_{rf} \cdot \frac{1}{2} \cdot \cos[2 \cdot \pi \cdot f_{IF} \cdot t] + \ldots + \ldots g \cdot V_{lo} \cdot V_{image} \cdot$$

$$\frac{1}{2} \cdot \cos[2 \cdot \pi \cdot (-f_{IF}) \cdot t] = g \cdot V_{lo} \cdot V_{rf} \cdot \frac{1}{2} \cdot \cos[2 \cdot \pi \cdot f_{IF} \cdot t] + g \cdot$$

$$V_{lo} \cdot V_{image} \cdot \frac{1}{2} \cdot \cos[2 \cdot \pi \cdot f_{IF} \cdot t]$$

The same equations can be written for the signal at the output of mixer 32b, i.e. at point C', as follows:

$$C' =$$

$$g \cdot A \cdot B' = \ldots = g \cdot V_{rf} \cdot \sin[2 \cdot \pi \cdot f_{RF} \cdot t] \cdot V_{lo} \cdot \cos[2 \cdot \pi \cdot (f_{RF} - f_{IF}) \cdot t] +$$

$$\ldots + g \cdot V_{image} \cdot \sin[2 \cdot \pi \cdot f_{image} \cdot t] \cdot V_{lo} \cdot \cos[2 \cdot \pi \cdot (f_{RF} - f_{IF}) \cdot t] =$$

$$g \cdot V_{rf} \cdot \sin[2 \cdot \pi \cdot f_{RF} \cdot t] \cdot V_{lo} \cdot \cos[2 \cdot \pi \cdot (f_{RF} - f_{IF}) \cdot t] +$$

$$\ldots + g \cdot V_{image} \cdot \sin[2 \cdot \pi \cdot (f_{RFe} - 2 \cdot f_{IF}) \cdot t] \cdot$$

$$V_{lo} \cdot \cos[2 \cdot \pi \cdot (f_{RF} - f_{IF}) \cdot t] =$$

$$g \cdot V_{lo} \cdot V_{rf} \cdot \frac{1}{2} \cdot \{\sin[2 \cdot \pi \cdot f_{IF} \cdot t] + \sin[2 \cdot \pi \cdot (f_{RF} - f_{IF}) \cdot t]\} +$$

$$\ldots + \ldots + g \cdot V_{lo} \cdot V_{image} \cdot \frac{1}{2} \cdot$$

$$\{\sin[2 \cdot \pi \cdot (-f_{IF}) \cdot t] - \sin[(2 \cdot f_{RF} - 3 \cdot f_{IF}) \cdot t]\}$$

At that point, the undesirable frequencies are removed. So, at point C', the signal is given as:

$$C' = g \cdot V_{lo} \cdot V_{rf} \cdot \frac{1}{2} \cdot \sin[2 \cdot \pi \cdot f_{IF} \cdot t] + \ldots + \ldots + g \cdot V_{lo} \cdot V_{image} \cdot$$

$$\frac{1}{2} \cdot \sin[2 \cdot \pi \cdot (-f_{IF}) \cdot t] = g \cdot V_{lo} \cdot V_{rf} \cdot \frac{1}{2} \cdot \sin[2 \cdot \pi \cdot f_{IF} \cdot t] - g \cdot$$

$$V_{lo} \cdot V_{image} \cdot \frac{1}{2} \cdot \sin[2 \cdot \pi \cdot f_{IF} \cdot t]$$

At point D, the signal after phase converter 35 is given as:

$$D = g \cdot V_{lo} \cdot V_{rf} \cdot \frac{1}{2} \cdot \sin[2 \cdot \pi \cdot f_{IF} \cdot t + 90°] \ldots - g \cdot V_{lo} \cdot V_{image} \cdot \frac{1}{2} \cdot$$

-continued $$\sin[2 \cdot \pi \cdot f_{IF} \cdot t + 90°] = \ldots = g \cdot V_{lo} \cdot V_{rf} \cdot \frac{1}{2} \cdot \cos[2 \cdot \pi \cdot f_{IF} \cdot t] \ldots -$$

$$g \cdot V_{lo} \cdot V_{image} \cdot \frac{1}{2} \cdot \cos[2 \cdot \pi \cdot f_{IF} \cdot t]$$

At point E, the signal after summer 36, that is the IF signal, is given as:

$$E = C + D = \frac{g \cdot V_{lo}}{2} \cdot \{V_{rf} \cdot \cos[2 \cdot \pi \cdot f_{IF} \cdot t] + V_{image} \cdot$$

$$\cos[2 \cdot \pi \cdot f_{IF} \cdot t]\} \ldots + \frac{g \cdot V_{lo}}{2} \cdot \{V_{rf} \cdot \cos[2 \cdot \pi \cdot f_{IF} \cdot t] - V_{image} \cdot$$

$$\cos[2 \cdot \pi \cdot f_{IF} \cdot t]\} \ldots = g \cdot V_{lo} \cdot V_{rf} \cdot \cos[2 \cdot \pi \cdot f_{IF} \cdot t]$$

The equation for signal E illustrates theoretically that the image frequency can be completely removed at point E which is the output terminal of image rejection mixer 30.

However, in actual implementations, the quality of the image rejection of an image rejection mixer is not entirely satisfactory. In most cases, an image rejection mixer, in actual implementation, does not remove all of the unwanted image frequency signal. This is because an image rejection mixer is sensitive to the characteristics of the devices forming the mixer and the characteristics of the processes used to fabricate the mixer. Process variations and device mismatches can result in unsatisfactory image rejection result.

For example, referring to FIG. 3, if the phase or amplitude of the local oscillator signals at points B and B' are not exactly the same or if mixers 32a and 32b suffer from device mismatches so that the two mixers exhibit mismatch in the phase or amplitude of the output signal, then the cancellation of the signal at image frequency will not be perfect and the unwanted image frequency signal will propagate through to corrupt the down-converted wanted RF signal.

FIG. 4 is a waveform diagram illustrating the waveforms at points C and D of the image rejection mixer of FIG. 3. As shown in FIG. 4, if the image frequency signals at points C and D have an imbalance in either phase or amplitude, their cancellation by the summer (or subtractor) 36 is not perfect. In FIG. 4, the rejected image frequency signal is waveform "C-D." If the signals at points C and D are perfectly matching, the rejected image signal will be nil. However, as shown in FIG. 4, when the signals at points C and D do not match, a residual image frequency signal remains. The residual image frequency signal C-D in FIG. 4 interferes with the frequency converted RF signal and is highly undesirable.

Therefore, an image rejection mixer with improved image rejection result is desired.

SUMMARY OF THE INVENTION

According to one embodiment of the present invention, an image rejection mixer includes an input terminal for receiving an input radio frequency (RF) signal, a first mixer, a first phase converter, a second mixer, a first output adjust circuit, a second output adjust circuit, a second phase converter and a combiner.

The first mixer is coupled to receive the input RF signal and a signal from a local oscillator where the local oscillator provides a signal having a local oscillator frequency. The first mixer includes a first mixer stage and a first output load stage and provides a first output signal. The first phase converter is coupled to convert the phase of the signal from the local oscillator and to generate a phase-converted local oscillator signal. The second mixer is coupled to receive the input RF signal and the phase-converted local oscillator signal. The second mixer includes a second mixer stage and a second output load stage and provides a second output signal. The first output adjust circuit is coupled to the first output load stage of the first mixer for modifying the signal waveform of the first output signal of the first mixer while the second output adjust circuit is coupled to the second output load stage of the second mixer for modifying the signal waveform of the second output signal of the second mixer. The second phase converter is coupled to convert the phase of the second output signal of the second mixer and to generate a phase converted output signal. Finally, the combiner is coupled to receive the first output signal and the phase converted output signal and combine the first output signal and the phase converted output signal to provide an output signal having an intermediate frequency.

In operation, the first output adjust circuit and the second output adjust circuit operate to modify the signal waveforms of the first output signal and the phase converter output signal so as to cancel nearly all signal components having an image frequency in the output signal having an intermediate frequency.

The present invention is better understood upon consideration of the detailed description below and the accompanying drawings.

DETAILED DESCRIPTION OF THE PREFERRED EMBODIMENTS

In accordance with the principles of the present invention, an image rejection mixer incorporates output adjust circuits coupled to the first and second mixers in the image rejection mixer circuitry whereby the output adjust circuits operate to modify the mixed signals from the mixers so that near-perfect image signal rejection is achieved. More specifically, the output adjust circuits modify the mixed signals of the mixers so that the mixed signals are perfectly balanced, thereby realizing a near-perfect image rejection when the two mixed signals are combined. In one embodiment, the output adjust circuit includes switchably connected passive components, such as resistors and capacitors, for adjusting the gain and phase shift of each of the first and second mixers so that near-perfect image frequency signal cancellation is realized. In another embodiment, a switchable low-pass filter can also be used in the output adjust circuit. By using switchably connected elements, the output adjust circuits are thus programmable and gain and phase shift adjustments can be modified over time to ensure consistent image rejection result.

Figure 1:
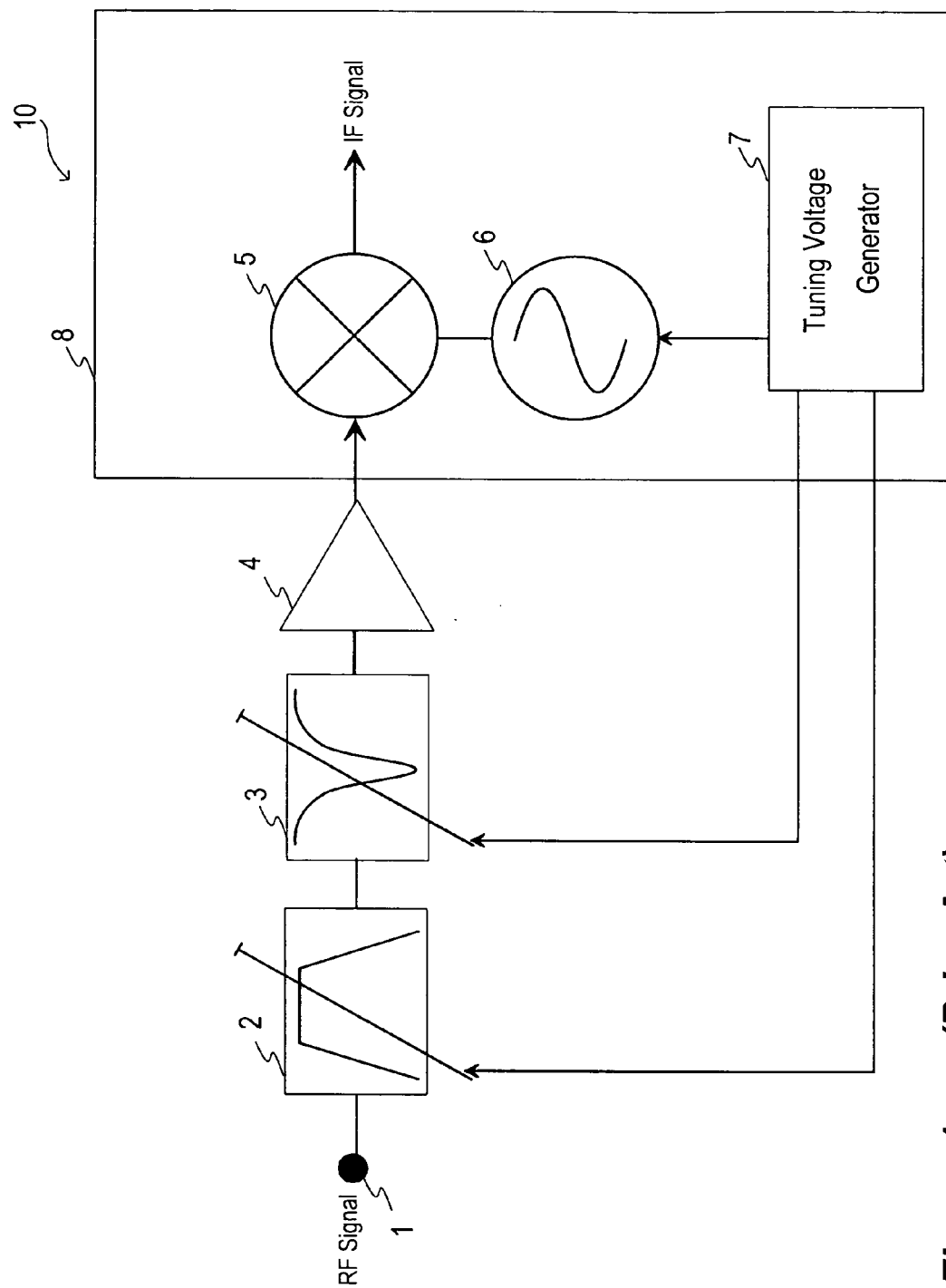
FIG. 1 is a conventional tuning system which can be used for the reception of low VHF, VHF and UHF broadcast channels.
Figure 2:
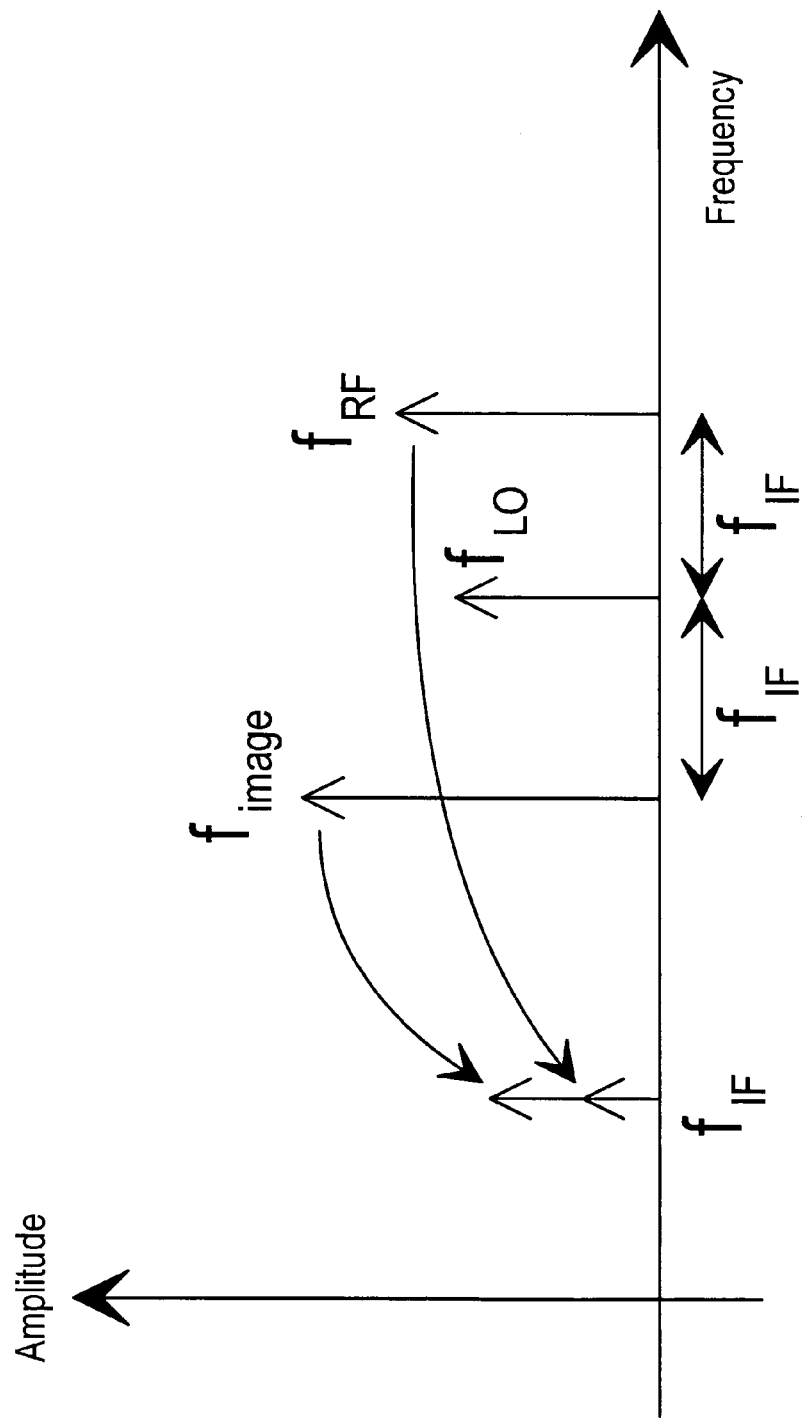
FIG. 2 is a frequency domain representation illustrating the interference problem introduced by an image frequency signal in a down-conversion, low-side mixing scheme.
Figure 3:
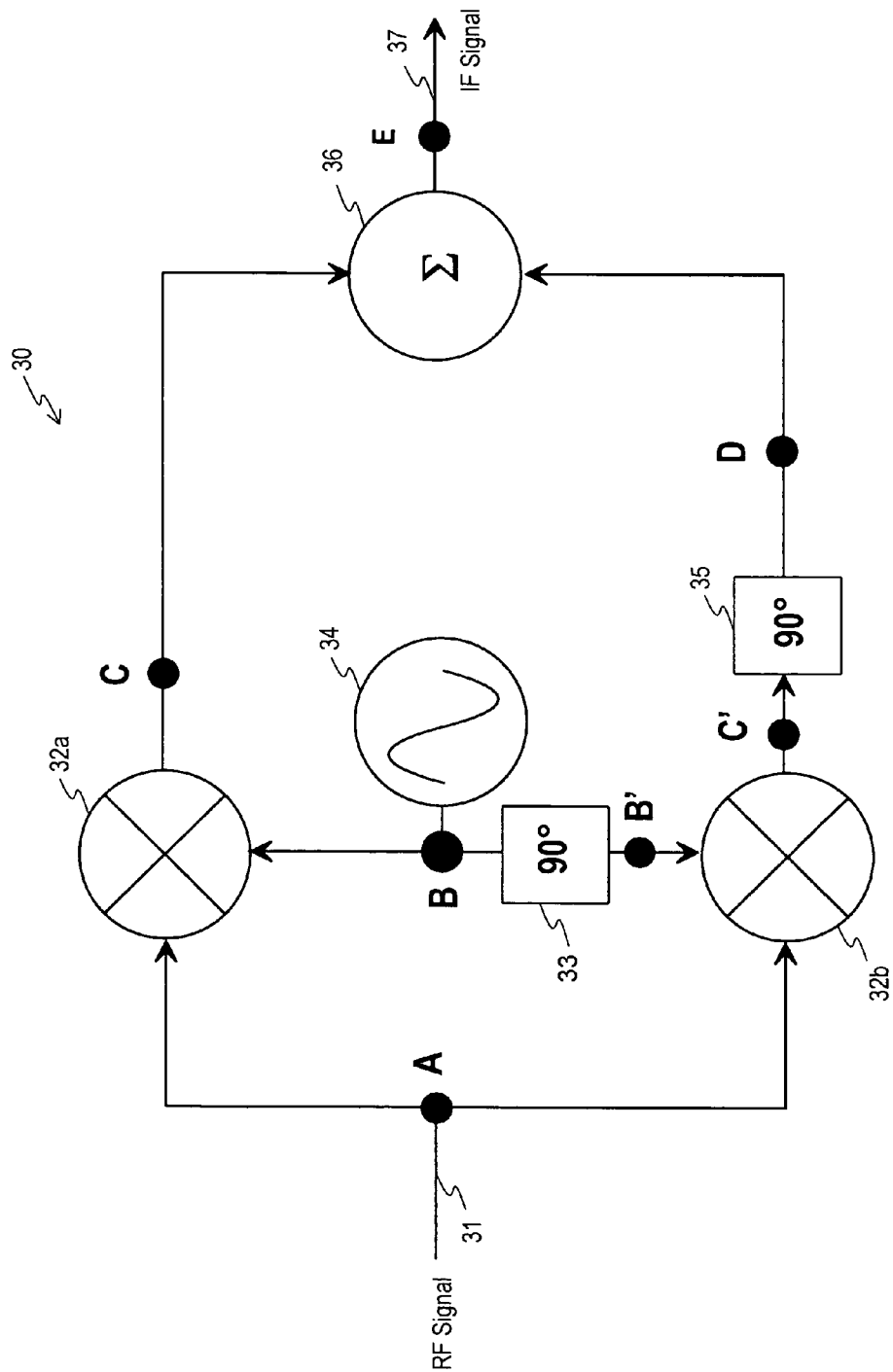
FIG. 3 is a circuit diagram of a conventional image rejection mixer.
Figure 4:
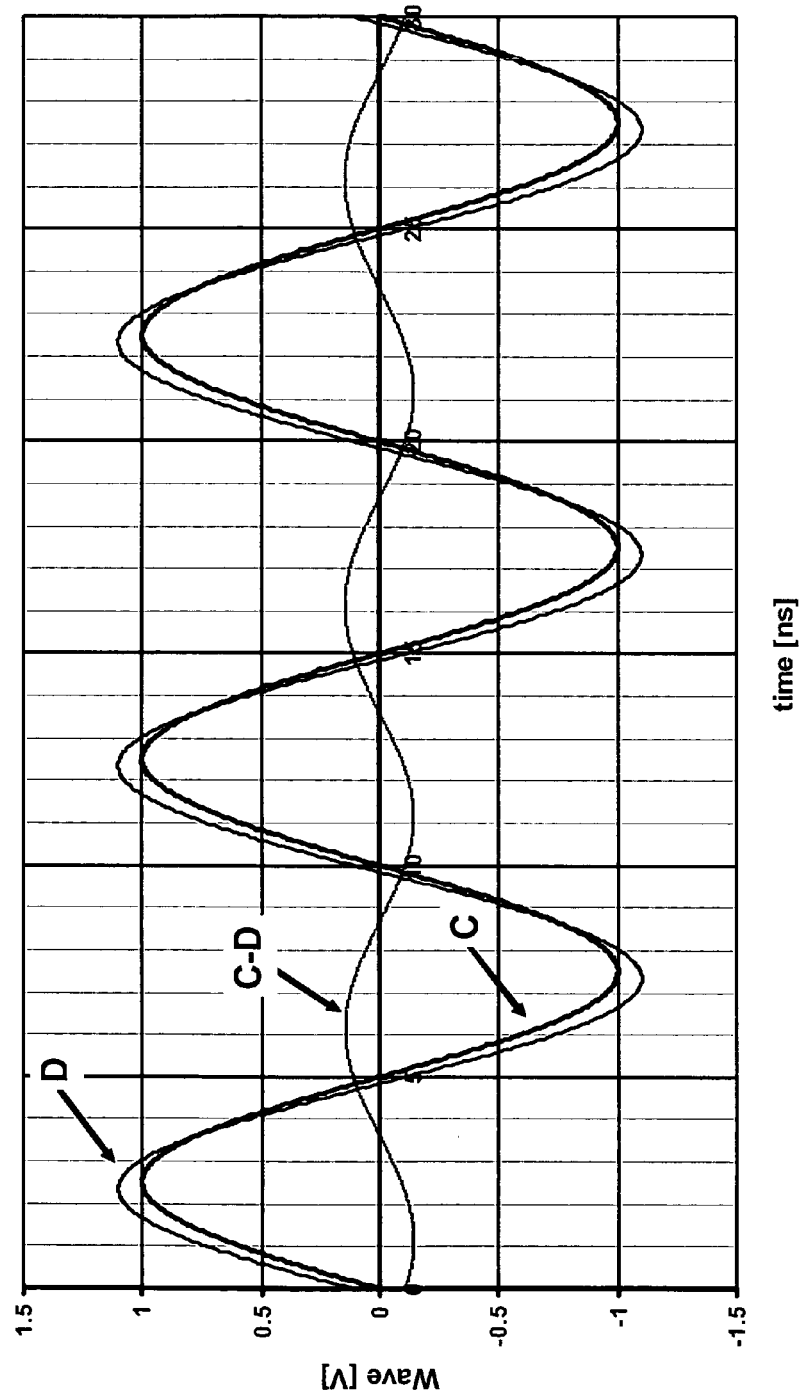
FIG. 4 is a waveform diagram illustrating the waveforms at points C and D of the image rejection mixer of FIG. 3.
Figure 5:
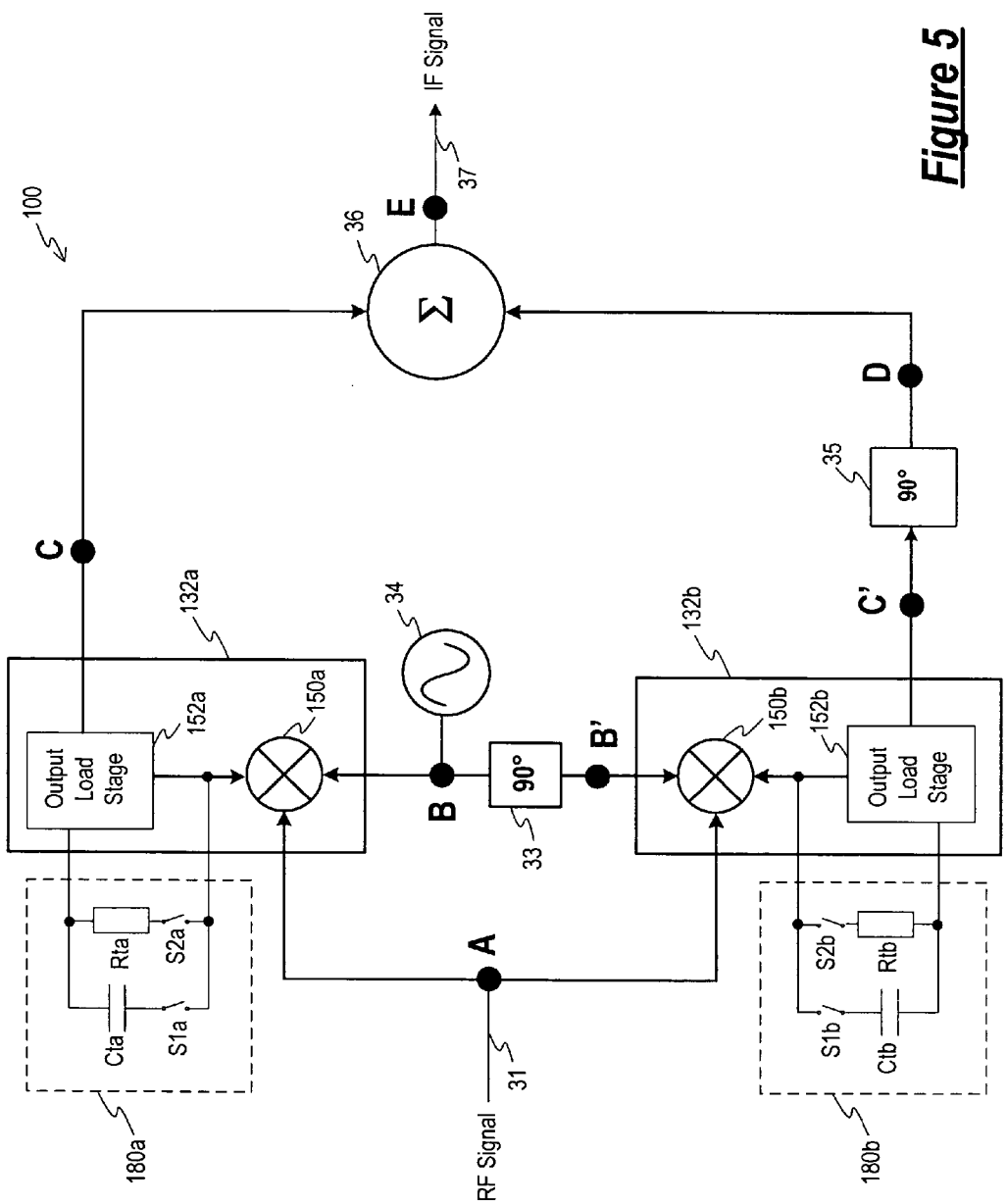
FIG. 5 is a schematic diagram of an image rejection mixer according to a first embodiment of the present invention.

FIG. 5 is a schematic diagram of an image rejection mixer according to a first embodiment of the present invention. The image rejection mixer of FIG. 5 is constructed in a similar manner to image rejection mixer 30 of FIG. 3. Like elements in FIGS. 3 and 5 are given like reference numerals to simplify the discussion. Referring to FIG. 5, an image rejection mix 100 receives an input RF signal on an input terminal 31. The input RF signal having a frequency $f_{RF}$ is coupled to a first mixer 132a and a second mixer 132b to be converted to an intermediate frequency (IF) signal at an intermediate frequency $f_{IF}$. A tunable voltage-controlled oscillator (VCO) 34 provides the local frequency for tuning to the desired broadcast channel. A first phase converter 33 is coupled between VCO 34 and second mixer 132b. A second phase converter 35 is coupled between second mixer 132b and a summer (or subtractor) 36. Summer 36 sums the mixed signals from first mixer 132a and second mixer 132b to generate the IF signal at frequency $f_{IF}$.

In FIG. 5, first and second mixers 132a, 132b are illustrated as each including an output load stage coupled to the mixer circuitry. A mixer inherently includes mixer circuitry and an output load stage coupled to the mixer circuitry to serve as a load and to provide the mixed output signal in the desired format (a voltage or current signal). For example, the output load stage can be a resistor. When a mixer is illustrated in a circuit diagram, the output load stage is usually not separately illustrated but is inherently present. However, in the present description, the output load stage is separately illustrated to facilitate the description of the present invention. Thus, in FIG. 5, first mixer 132a is illustrated as having a mixer stage 150a and an output load stage 152a while second mixer 132b is illustrated as having a mixer stage 150b and an output load stage 152b. It is understood that mixer 132a and mixer 132b, shown as each including a mixer stage and an output load stage, have the same construction as mixer 32a and mixer 32b shown in FIG. 3.

In a conventional image rejection mixer, such as image rejection mixer 30, mismatch in devices of the output load stages of the two mixers can result in mixed output signals having different phase shift or different gain. Therefore, precise image rejection result cannot be obtained. In accordance with the present invention, an output adjust circuit is incorporated in each of the first and second mixers of the image rejection mixer so that the mixed output signals are near perfectly balanced. In this manner, the image rejection quality of the image rejection mixer is improved.

In image rejection mixer 100 of FIG. 5, an output adjust circuit 180a is coupled to first mixer 132a and an output adjust circuit 180b is coupled to second mixer 132b. Specifically, output adjust circuit 180a is coupled in parallel to output load stage 152a of first mixer 132a while output adjust circuit 180b is coupled in parallel to output load stage 152b of second mixer 132b. Each of output adjust circuits 180a, 180b includes a bank of switchably connected passive components. In the present embodiment, output adjust circuit 180a includes a capacitor Cta and a resistor Rta both switchably connected in parallel with output load stage 152a through switches S1a and S2a, respectively. On the other hand, output adjust circuit 180b includes a capacitor Ctb and a resistor Rtb both switchably connected in parallel with output load stage 152b through switches S1b and S2b, respectively. Switches S1a, S2a, S1b, and S2b can be implemented in many ways and in one embodiment, the switches are MOSFET switches.

In the present embodiment, each of output adjust circuits 180a, 180b includes only one capacitor and one resistor. This is illustrative only and in other embodiments, the output adjust circuit typically include a bank of passive components for introducing the desired impedance. The bank of passive components can include one or more capacitors and/or one or more resistors. Multiple capacitors and resistors can have the same capacitance/resistance values or different capacitance/resistance values.

Output adjust circuits 180a and 180b modify the mixed signals provided by mixers 132a and 132b to remove any imbalance between the two mixed signals. Specifically, gain mismatches between mixer 132a and mixer 132b can be eliminated by introducing appropriate resistance in parallel with one or both of the output load stages. By adding the appropriate amount of resistance, the gain of each mixer is slightly modified so that the gain of both mixers can be made to match. On the other hand, phase shift mismatches between mixer 132a and mixer 132b can be eliminated by introducing appropriate capacitance in parallel with one or both of the output load stages. By adding the appropriate amount of capacitance, the phase shift of each mixer is slightly modified so that the phase shift of both mixers can be made to match.

By using the output adjust circuit of the present invention, the desired impedance (i.e., resistance, capacitance, or inductance) can be added to the output load stage of each mixer by selecting one or more of the switches. The programming of the switches can be accomplished through control circuitry external to the image rejection mixer. When the desired resistance and/or capacitance are introduced, the mixed signals at point C and D can be made to exactly match, thereby allowing precise image rejection.

One feature of the output adjust circuit of the present invention is that through the use of programmable switches, the amount of resistance and/or capacitance introduced can be varied over time to provide different gain and/or phase shift adjustment as needed. Thus, as the image rejection mixer is applied in a system, the performance of the image rejection mixer can be guaranteed over the course of operational lifetime of the device.

The output voltages of mixers 132a and 132b can be given as follows. First, assume that all switches S1a, S2a, S1b and S2b are open so that no additional impedance is introduced by the output adjust circuits, the output voltage at each of mixers 132a and 132b is given as follows:

$$V_{out} = i \cdot \text{Load}, \quad \text{Eq. IIIa.}$$

where "Load" denotes the impedance of the respective output load stage (152a or 152b) and "i" denotes the current at the output of each mixer.

Now assume that switch S2a in output adjust circuit 180a is closed, the output voltage of mixer 132a becomes:

$$V_{out} = i1 \cdot \text{Load} + i2 \cdot Rta, \quad \text{Eq. IIIb.}$$

where current i1 denotes the current flowing through output load stage 152a and current i2 denotes the current flowing through resistor Rta.

On the other hand, assume that switch S1a in output adjust circuit 180a is closed, the output voltage of mixer 132a becomes:

$$V_{out} = i1 \cdot \text{Load} + i3 \cdot j \cdot \omega \cdot Cta, \quad \text{Eq. IIIc.}$$

where current i1 denotes the current flowing through output load stage 152a and current i3 denotes the current flowing through capacitor Cta.

By examining equations IIIa through IIIc, it can be seen that the output voltage of mixer 132a can be modified from starting condition (equation IIIa) through the introduction of impedances through the use of switches S1a and S1b. For instance, the amplitude of the signal waveform at the output of mixer 132a is modified by the introduction of resistance as shown by equation IIIb above. The phase of the signal waveform at the output of mixer 132a is modified by the introduction of capacitance as shown by equation IIIc above. The same signal waveform modification applies to mixer 132b through the use of switches S1b and S2b in output adjust circuit 180b.

In one embodiment, the amount of impedance to be added is determined by detecting the presence of a signal at the image frequency at the output signal of the image rejection mixer (i.e., the IF signal). After the signal at the image frequency is detected, appropriate correction can then be provided through the application of one or more switches to add the desired amount of resistance and capacitance to the output load stages of the mixers.

Figure 6:
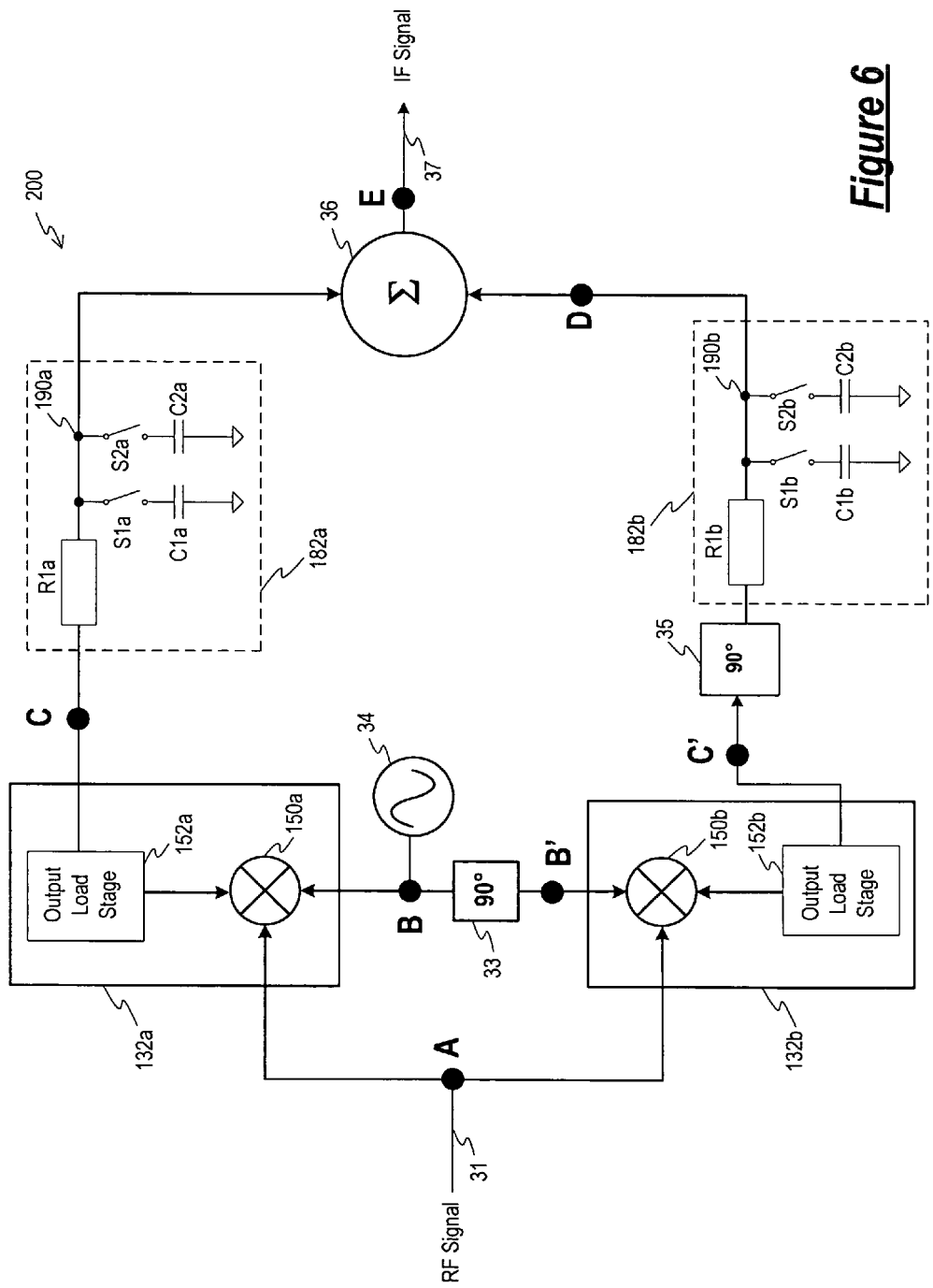
FIG. 6 is a schematic diagram of an image rejection mixer according to a second embodiment of the present invention.
Figure 7:
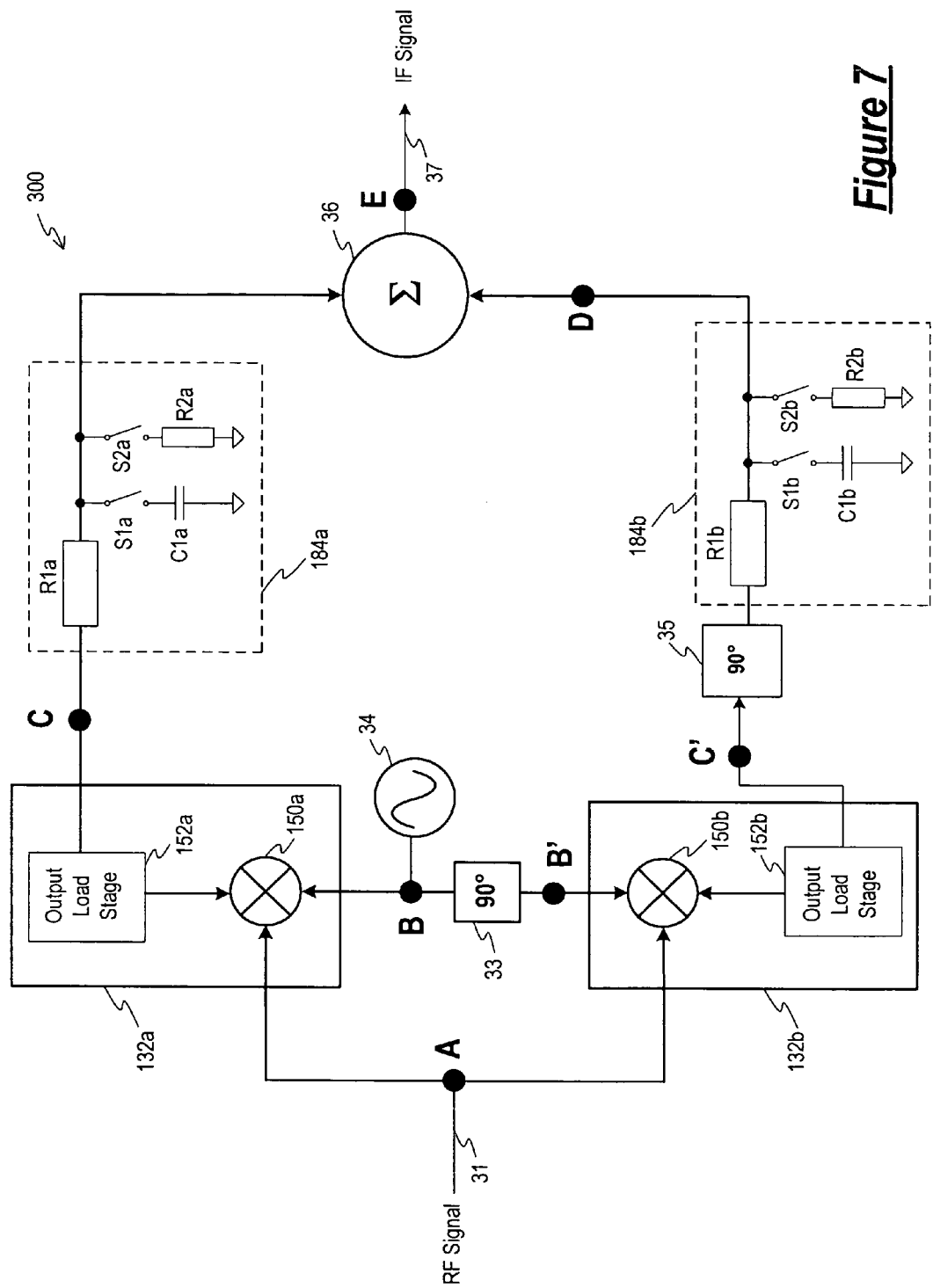
FIG. 7 is a schematic diagram of an image rejection mixer according to a third embodiment of the present invention.

According to another aspect of the present invention, the output adjust circuit to be coupled to the output load stage of the mixer in the image rejection mixer is configured as a low-pass filter. FIG. 6 is a schematic diagram of an image rejection mixer according to a second embodiment of the present invention. FIG. 7 is a schematic diagram of an image rejection mixer according to a third embodiment of the present invention. Like elements in FIGS. 5-7 are given like reference numerals to simplify the descriptions.

Referring to FIG. 6, an output adjust circuit 182a is coupled to the output terminal (point C) of mixer 132a while an output adjust circuit 182b is coupled to the output terminal (at the output of phase converter 35 coupled to point C') of mixer 132b. In the present embodiment, each of output adjust circuits 182a, 182b is configured as a low pass filter. Specifically, output adjust circuit 182a includes a resistor R1a connected between the output terminal (point C) of mixer 132a and a node 190a which is coupled to a first input terminal of summer (or subtractor) 36. A bank of capacitors C1a and C2a are switchably connected in parallel to node 190a. The combination of resistor R1a and one or more capacitors C1a and C2a forms a low-pass filter for low-pass filtering the output signal waveform of mixer 132a. Output adjust circuit 182b is constructed in a similar manner to output adjust circuit 182a where a resistor R1b is connected between the output terminal of phase converter 35 and node 190b and a bank of capacitors C1b and C2b are switchably connected in parallel to node 190b, thereby forming a low-pass filter.

Referring to FIG. 7, each of output adjust circuits 184a and 184b is configured as a low-pass filter with switchably connected resistor and capacitor elements. By including switchable resistor elements, the operational parameters of the low-pass filters can be fine tuned to provide precise output voltage modification.

In FIG. 6, the low pass filter in each of output adjust circuits 182a and 182b includes a bank of two switchably connected capacitors. In FIG. 7, the low pass filter in each of output adjust circuits 184a and 184b includes a bank of switchably connected capacitor and one switchably connected resistor. It is understood that the embodiments shown in FIGS. 6 and 7 are illustrative only and in other embodiments, the low pass filter in the output adjust circuit can include one or more switchably connected resistors and/or one or more switchably connected capacitors. Multiple resistors and capacitors can have the same or different resistance/capacitance values.

It is instructive to note that mixers 132a and 132b are typically constructed to provide differential output signals. For ease of illustrations, the mixer circuits in FIGS. 5-7 are illustrated as having only one output signal. It is understood that mixers 132a and 132b in FIGS. 5-7 can have differential output signals at points C and C'. In that case, a separate output adjust circuit is provided for each of the differential output signals.

The above detailed descriptions are provided to illustrate specific embodiments of the present invention and are not intended to be limiting. Numerous modifications and variations within the scope of the present invention are possible. The present invention is defined by the appended claims.

We claim:

1. An image rejection mixer comprising:
an input terminal for receiving an input radio frequency (RF) signal;
a first mixer coupled to receive said input RF signal and a signal from a local oscillator, said local oscillator providing a signal having a local oscillator frequency, said first mixer including a first mixer stage and a first output load stage and providing a first output signal;
a first phase converter coupled to convert a first phase of said signal from said local oscillator and to generate a phase-converted local oscillator signal;
a second mixer coupled to receive said input RF signal and said phase-converted local oscillator signal, said second mixer including a second mixer stage and a second output load stage and providing a second output signal;
a first output adjust circuit coupled to said first output load stage of said first mixer for modifying a signal waveform of said first output signal of said first mixer;
a second output adjust circuit coupled to said second output load stage of said second mixer for modifying a signal waveform of said second output signal of said second mixer;
a second phase converter coupled to convert a second phase of said second output signal of said second mixer and to generate a phase converted output signal; and
a combiner coupled to receive said first output signal and said phase converted output signal and combine said first output signal and said phase converted output signal to provide an output signal having an intermediate frequency,
wherein said first output adjust circuit and said second output adjust circuit operate to modify signal waveforms of said first output signal and said phase converted output signal so as to cancel nearly all signal components having an image frequency in said output signal having an intermediate frequency.

2. The image rejection mixer of claim 1, wherein said each of said first and second output adjust circuits comprises one or more switchably connected passive electrical components, the one or more switchably connected passive electrical components being connected in parallel with each other and with the respective output load stage of the respective mixer and operative to modify the impedance of the respective output load stage of the respective mixer.

3. The image rejection mixer of claim 2, wherein the one or more switchably connected passive electrical components comprises one or more switchably connected resistors.

4. The image rejection mixer of claim 3, wherein the one or more switchably connected resistors comprises resistors having the same resistance values.

5. The image rejection mixer of claim 3, wherein the one or more switchably connected resistors comprises resistors having different resistance values.

6. The image rejection mixer of claim 3, wherein the one or more switchably connected capacitors comprises capacitors having the same capacitance values.

7. The image rejection mixer of claim 3, wherein the one or more switchably connected capacitors comprises capacitors having different capacitance values.

8. The image rejection mixer of claim 2, wherein the one or more switchably connected passive electrical components comprises one or more switchably connected capacitors.

9. The image rejection mixer of claim 1, wherein said each of said first and second output adjust circuits comprises a low-pass filter coupled to receive the respective one of the first output signal of said first mixer and said phase converted output signal of said second mixer, the low-pass filter providing a filtered output signal to the combiner.

10. The image rejection mixer of claim 9, wherein said low-pass filter comprises:
an input node receiving the respective one of the first output signal of said first mixer and said phase converted output signal of said second mixer;
a first resistor connected between said input node and an output node; and
one or more switchably connected passive electrical components connected in parallel between said output node and a power supply node.

11. The image rejection mixer of claim 10, wherein the one or more switchably connected passive electrical components comprise one or more switchably connected resistors.

12. The image rejection mixer of claim 10, wherein the one or more switchably connected passive electrical components comprise one or more switchably connected capacitors.

13. The image rejection mixer of claim 1, wherein said first phase converter provides a 90° phase conversion and said second phase converter provides a −90° phase conversion.

14. The image rejection mixer of claim 1, wherein said combiner comprises one of a summer and a subtractor.

* * * * *